April 21, 1964  J. E. STEIN  3,129,764
VALVED SHOE FOR PRESSURE TESTING APPARATUS
Filed April 16, 1959  2 Sheets-Sheet 1

INVENTOR.
JOHN E. STEIN
BY
Philip H. Sheridan
ATTORNEY

April 21, 1964 J. E. STEIN 3,129,764
VALVED SHOE FOR PRESSURE TESTING APPARATUS
Filed April 16, 1959 2 Sheets-Sheet 2

INVENTOR.
JOHN E. STEIN
BY Philip H. Sheridan
ATTORNEY

United States Patent Office 3,129,764
Patented Apr. 21, 1964

3,129,764
VALVED SHOE FOR PRESSURE TESTING
APPARATUS
John E. Stein, 3565 Ivy St., Denver, Colo.
Filed Apr. 16, 1959, Ser. No. 806,930
3 Claims. (Cl. 166—226)

This invention relates to a means for detecting casing and tubing defects in a well bore; and, more particularly, relates to a pressure testing apparatus adaptable for disposition on a casing string for indicating leaks in a casing string in its final, made-up condition prior to the cementing operation.

Preceding various operations which are conducted downhole in a well, such as acidizing, fracturing, or cementing of the casing prior to perforation of casing for withdrawal of the oil, it is customary to pressure-test the casing string for the purpose of insuring that there are no ruptures, splits or similar defects. In general, this pressure testing operation consists in sealing off the string being tested at the desired point followed by the application of pressure within the string, and any loss in pressure below a predetermined level would then indicate a leak in the casing string. Suitable means may then be employed for locating the critical area and the leak may be repaired before proceeding with the various operations.

Although the testing apparatus of the present invention is adapted for pressure testing casing or tubing string prior to carrying on various types of operations, it is most desirably employed in pressure testing a casing string immediately before cementing the string in place for purposes of completing the well for oil and gas production or prior to the resumption of drilling operations, if the casing set is for protective purposes. Briefly, in conducting the pressure testing operation on a casing string, the pressure testing apparatus is customarily disposed at any desired point along the casing string or at the bottom of the string and thereafter, when the string is landed on the bottom of the hole, the casing is sealed off at the desired point in accordance with the location of the testing apparatus and fluid pressure is applied to the casing string up to a predetermined pressure level to insure that no leaks are present at the joints or intermediate points along the casing. Once tested, the testing apparatus must necessarily include some provision for opening the casing string to permit the flow of drilling fluids and cement unrestricted through the casing string and the pressure testing apparatus into the bottom of the well bore and up along the annulus between the casing and the hole.

In accordance with the present invention it is proposed to provide for means in the form of telescoping elements to carry out the pressure testing of the casing string which is dependable, inexpensive and incorporates a minimum number of parts, and which also eliminates the necessity of rupturing or removing the sealing means, or removal of the element or drilling out of the element in order to proceed with the cementing operations; yet at the same time will not interfere with the flow of drilling fluids and cement through the casing string once the pressure testing operation is completed.

It is therefore a primary object of the present invention to provide for a unique and simplified way of positively and selectively sealing the casing string for pressure testing operations followed by the rapid and efficient opening of the casing for the injection of cement therethrough.

It is another object to provide for novel and improved means adaptable for disposition at the lower end of a casing string which is so constructed and arranged as to establish through the relative movement of a minimum number of parts selective closing and opening of the lower end of the casing string for pressure testing and cementing operations, respectively; and moreover, to provide in combination with the above connecting means disposed at a location away from the interior of the casing for separation of the first named means at a predetermined pressure level in the event of interference with the flow of cement through the first named means in the open position.

It is a further object to provide for an improved pressure testing apparatus, which eliminates complex valving and packing structure, for disposition at the lower end of a casing string and which has incorporated therein normally open ports to establish communication between the interior of the casing and the well bore, and with the apparatus being operative to move to a position in response to engagement with the bottom hole of the well bore to close the ports for the purpose of pressure testing the casing string.

The above and other objects and advantages of the present invention will become more apparent from the following detailed description taken together with the accompanying drawings, in which.

Figure 1:
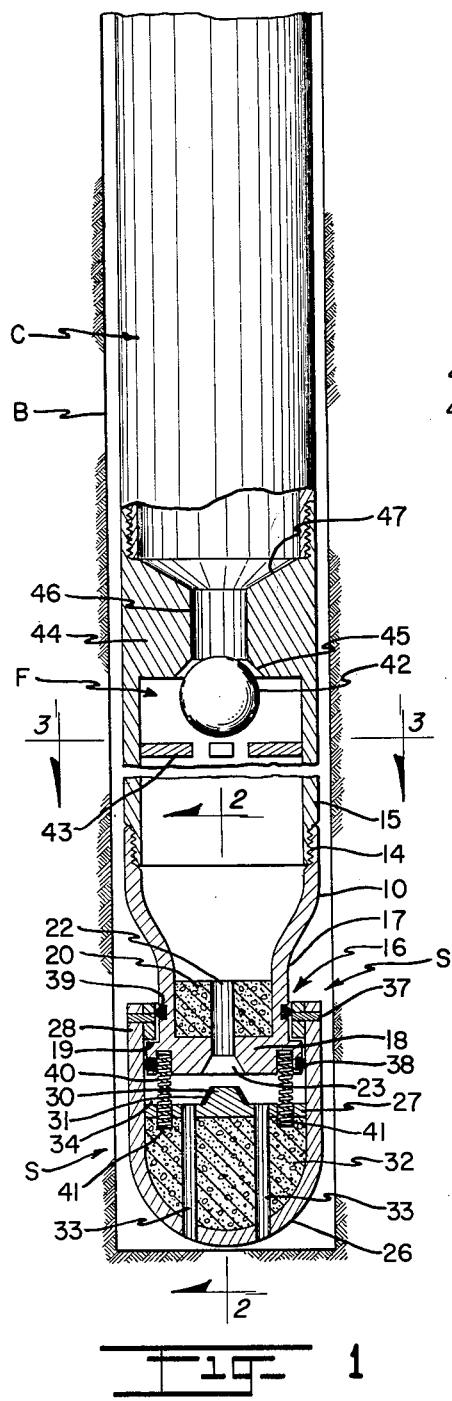
FIGURE 1 is an elevational view, partially in section, illustrating the disposition of a preferred form of pressure testing apparatus at the lower end of a casing string in a well bore.
Figure 2:
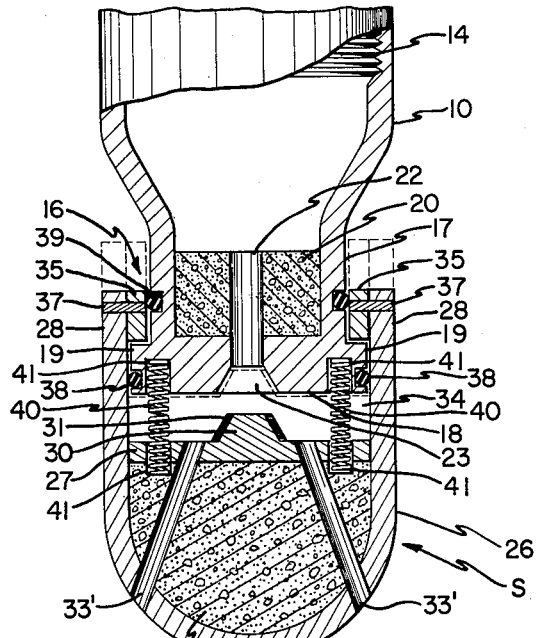
FIGURE 2 is an enlarged cross section view taken on line 2—2 of FIGURE 1, partially in section, illustrating a somewhat modified form of pressure testing apparatus, in accordance with the present invention.
Figure 3:
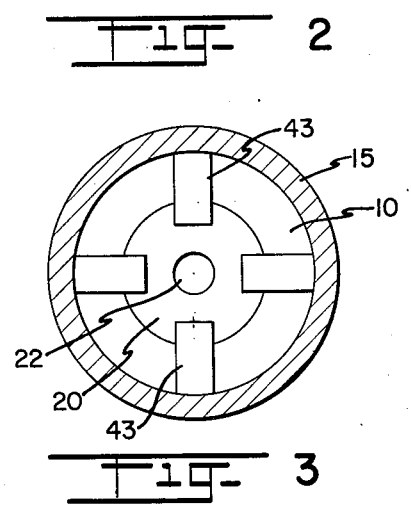
FIGURE 3 is a cross section view taken on line 3—3 of FIGURE 1.

With more particular reference to the drawings, there is shown, for purposes of illustration and not limitation, in FIGURES 1 to 3 a preferred embodiment of the present invention in the form of a casing shoe S secured to the bottom joint of a casing string C lowered into a well bore B, together with a float collar F which is generally disposed one or two joints above the casing shoe S, and in a well known manner serves to prevent the back flow of cement once injected through the casing string and into the well bore. Of course, the float collar F forms no part of the present invention and various forms may be employed to accomplish the intended purpose. In this connection, it will be apparent that the pressure testing apparatus may be in the form of either a casing shoe or casing collar depending upon its disposition along the casing string, although the testing apparatus of the present invention is especially designed to function as a casing shoe and in this way to enable use of the bottom limit of the well bore to aid in regulation of the opening and closing of the casing shoe for carrying out the pressure testing and cementing operations.

Now referring more specifically to FIGURES 1–3, there is shown in the drawings a casing shoe S consisting essentially of a generally cylindrical connector 10 which at its upper end is adapted to form a continuation of the lower end of the casing string and for this purpose is provided with an internally threaded collar 14 for attachment to the lower pin end 15 of the casing C. From the collar portion 14 the connector 10 converges into a reduced lower end section 16 which includes a wall 17 of reduced diameter together with a thick, annular plate 18 forming a horizontal continuation of the wall 17, together with an outwardly directed ledge 19 forming an integral part of the plate 18 and wall portion 17. Positioned within the reduced lower end portion 16 is an annular core portion 20 which is preferably composed of a light weight drillable substance, such as a Bakelite and cement mixture and which together with the annular plate 18 forms the wall of a fluid passage 22 extending vertically therethrough into a downwardly facing annular seat portion 23.

Defining the movable closure element of the casing shoe S is a rounded, cup-shaped nose section 26 broadly comprised of an intermediate, horizontally disposed valve plate 27 together with an outer, generally cylindrical sleeve portion 28 extending upwardly from the valve plate in outer concentric relation with respect to the lower end 16 and ledge 19. The valve plate 27 is a relatively thin member which may either be welded or otherwise suitably secured such as by bolts to the inner surface of the rounded nose portion 26, and at the center of the valve plate on its top surface there is provided an upstanding valve member 30 which conforms in configuration to the shape of the annular seat 23 and, for example, can be in the form of a truncated cone having an elastomeric lining 31 on its exterior surface forming a seal to engage the annular seat 23. Again, a core member 32 is shown disposed within the nose 26 below the valve plate and is suitably composed of a material similar to that used for the core 20 in the reduced lower end portion 16, such as a mixture of cement or Bakelite, and extending vertically through the lower end of the rounded nose portion including the valve plate 27 and core 32 are vertical fluid passages 33 spaced circumferentially around the valve element 30 in offset relation to the central fluid passage 22, so as to establish communication between the interior of the casing string with the bottom hole of the well bore B.

It will be noted from FIGURE 1 that the sleeve 28 together with the reduced lower end portion 16, including the circular ledge 19, are so dimensioned together that the sleeve will extend upwardly over the ledge portion 19 in adjacent, but spaced relation thereto so that the diameter of the sleeve is substantially the same as the outer diameter of the casing string C. In this way, the outer extent of the casing shoe S will not constitute an obstruction or be unduly enlarged so as to become stuck in the well bore passage and together with the rounded bottom of the nose portion will provide for easy passage of the casing shoe together with the casing string down through the well bore to the bottom. It will be further seen that the sleeve 28 is of a length to extend beyond the ledge 19 and nevertheless provide for an annular space 34 between the plates 18 and 27 respectively such that the fluid passages 22 and 33 are normally in communication with one another to provide for the flow of cement therethrough to the exterior of the well bore B. In addition, the sleeve 28 is provided with an inwardly disposed abutment 35 in the form of a circular ring which is secured to the inner surface of the sleeve adjacent to its top surface by means of shear pins 37 which project inwardly from the wall of the sleeve at spaced circumferential points adjacent the top surface. Accordingly, the abutment 35 will be then free to slide along the exterior wall surface of the wall 17 and will be limited in upward movement when the plate 27 engages the plate 18, and in downward movement when the abutment ring 35 engages the top surface of the ledge 19.

In order to seal the engaging wall surfaces between the sleeve 28 and lower end portion 16 a circular O-ring 38 is shown disposed in a groove at the lower end of the ledge 19, together with an O-ring 39 disposed in a circular groove on the exterior surface of the wall portion 17 at a location to engage the upper end of the abutment ring 35 when resting against the top surface of the ledge 19.

In order to dampen the movement between the nose portion 26 and reduced lower end portion 16 resilient elements in the form of springs 40 are arranged for interconnection between the plate 18 and valve plate 27 by insertion of the opposite ends of each of the springs into counterbored portions 41 provided at diametrically opposed locations on the respective plates adjacent to their outer periphery. Of course any number of springs 40 may be provided at spaced circumferential locations around the plates 18 and 27 and it will be evident that they will tend to resist unduly rapid movement between the nose portion 26 and reduced lower end portion 16 in traveling between the open and closed positions.

In positioning the casing string C together with the attached casing shoe S in the well bore it will be evident that as the nose portion 26 lands on the bottom hole of the well bore the casing string C will continue to move until the plate member 18 contacts the valve plate 27 with the valve member 30 acting to move in to sealed engagement with the annular seat portion 23 so as to seal off the entire lower end of the casing string C. In this closed position, fluid pressure may be applied to the interior of the casing string at the desired level in order to insure the absence of any defects or leaks in the casing. When the pressure testing operation is completed, it is then only necessary to raise the casing string C so that the plate 18 and annular seat portion 23 will move out of engagement with the valve plate 27 and element 30 respectively and the ledge 19 will move into engagement with the abutment ring 35 so as to limit relative movement between the respective members. At this position the fluid passages 22 and 33 will be in communication with one another and the cement may be injected downwardly through the fluid passages into the exterior well bore so as to cement the lower end of the casing string in place prior to perforation and withdrawal of the oil.

In the cementing operation the float collar F is brought into play and in a well known manner will permit the downward flow of cement therethrough, but is so valved as to prevent any return flow of the cement through the casing when the cementing operation is completed. This is accomplished by interposition of a ball valve element 42 in spaced relation between a series of radial shoulder elements 43 and an upper annular valve body 44 having annual seat 45 at its lower end. The seat 45 contacts the valve element 42 and seals off passage 46 in the valve element in the event of any tendency of the cement to return through the casing string. Of course during the normal cementing operation the lower shoulder elements are spaced from one another as shown in FIGURE 3, to limit the downward movement of the valve element 42 yet permit the cement to flow down between the shoulder elements through the casing shoe S. For a purpose to be described, the valve body 44 may also be provided with a concave seat portion 47 forming the top surface thereof, and, in general, various suitable means may be provided for securing the valve body 44 and shoulder portions 43 in desired relation to the inner wall of the casing string C.

In the modified form of FIGURE 2 the casing shoe S is constructed essentially the same as that shown and described in FIGURE 1 with the exception that fluid passages 33' are directed downwardly at a slight angle to the vertical through the lower closed end of the nose portion and this angle is preferably the same as that given to the angle of the conical valve element 30 and annular seat portion 23 such that the passages will form a continuation of the direction of flow of cement leaving the annular seat portion 23. In this way, the cement will not be forced to change direction of flow as it leaves the annular seat portion but will continue outwardly through the passages 33' into the bottom of the well bore. In addition, by leading the cement away from the bottom extremity of the nose portion 26 the cement will pour nto the bottom hole at a point between the bottom extremity of the hole and the side of the well bore so as to provide for most even distributin of the cement around the bottom and sides of the casing shoe and lower portion of the casing string.

Figure 4:
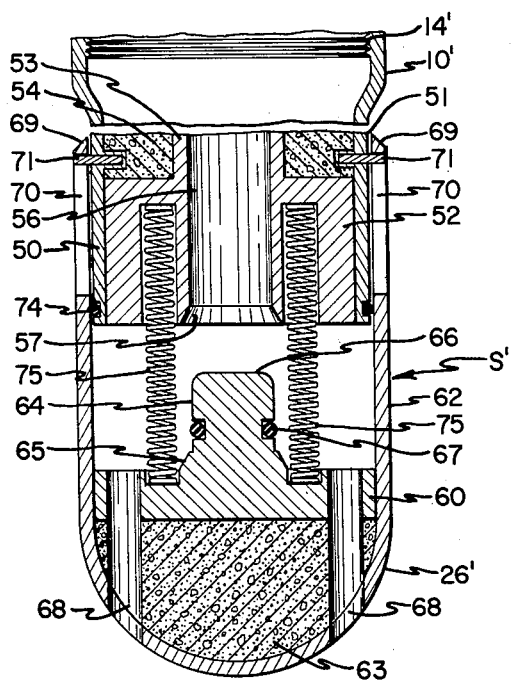
FIGURE 4 is a vertical section view of a modified form of pressure testing apparatus, in accordance with the present invention.

In the modified form of FIGURE 4, there is illustrated a casing shoe S' constituted of a connector section 10' for attachment to the lower end of the casing string C, together with a moveable closure element again defined by a rounded nose portion 26' which engages the bottom hole of the well bore for closing the normally open passages extending through the casing shoe. The form shown in FIGURE 4 is designed to further simplify the manner of connection between the members forming the casing shoe and in such a way as to additionally decrease the number of parts and to lessen the extent of convergence of the connector element into the reduced lower end portion, thereby providing a smooth exterior surface for descendance of the casing shoe and connected casing string through the well bore into position on the bottom. To this end, the connector element 10' is connected as before to the lower end of the casing string and from the collar 14' converges slightly into a reduced lower end portion 50 which is made up of a cylindrical wall 51 and inner concentric, relatively thick, annular sleeve portion 52 secured to the inner surface of the wall 51. Adjacent to the lower end of the wall 51 the sleeve member 52 is preferably a solid metallic section having a relatively thin walled sleeve portion 53 forming an upwardly extending continuation of the sleeve from the inner wall to a point adjacent the upper extremity of the outer wall portion 51. In the annular space formed between the continuation 53 and wall portion 51 an annular core 54, again preferably composed of a mixture of cement and Bakelite, is inserted therein so as to lighten the connector element 10' as a whole while at the same time supporting the sleeve portion 53. Of course, the sleeve 52 is designed in much the same way as the previously described plate 18 shown in FIGURE 1 to define along the inner wall surface thereof a fluid passage 56 together with an annular seat portion 57 at the lower end of the sleeve 52.

The nose portion 26' again forms the closure member broadly comprised of a valve plate 60 attached to extend horizontally across the lower end of the nose portion together with an outer, generally cylindrical sleeve member 62 extending from the valve plate in outer concentric relation over the wall portion 51. Also, a solid core 63 of drillable material, serves to fill the space in the lower end of the nose portion 26' just beneath the valve plate 60. The valve plate 60, in turn, is provided with an upstanding valve member 64 having an enlarged base portion 65 converging into a cylindrical head portion 66 on which there is provided a circular seal 67. In addition extending vertically through the lower end of the nose portion 26' are fluid passages 68 which, as before, are disposed in offset relation with respect to the fluid passage 56.

A primary feature of the modified form of FIGURE 4 is in the manner of connection of the outer sleeve 62 to the outer wall portion 51 of the connector element 10' so as to greatly simplify the connection and to eliminate the number of parts necessary for the connection. To this end, the outer sleeve portion 62 is provided with a tapered rim 69 forming the top surface of the sleeve and spaced just below the rim portion 69 are a series of longitudinal slots 70 spaced around the periphery of the sleeve 62 to accommodate a series of correspondingly spaced shear pins 71 projecting through the exterior of the wall portion 51 of the connector element 10'. In this way, the sleeve 62 is free to slide along the wall portion 51 between the limits defined by the engagement of the shear pins 71 with the opposed ends of the slot member 70, and generally these limits of movement correspond with the desired movement of the valve element 64 on the nose portion for opening and closing the main fluid passage 56 of the connector element 10'. Again, seals 74 may be disposed in axial, spaced relation around the exterior of the lower end of the wall portion 51 and springs 75 may be attached between the sleeve 52 and valve plate 60 in a manner similar to that described with reference to the connection of springs 40.

In the light of the above description of the forms of invention shown in FIGURES 1 to 4 it will be evident that the manner of disposition and arrangement of the fluid passages, the valve members and sleeve member on the closure element may be varied substantially without departing from the principles of the invention. For example, the valve plate may of course form a part of the connector element 10' and with the valve seat portion located on the lower end of the nose portion 26 and accordingly, the arrangement of the fluid passages extending through the connector element and nose portions could be reversed, also. In addition, with this arrangement it would be further possible to reverse the disposition of the wall portion 51 with the sleeves 62, for example, such that the wall extends in outer concentric relation over the sleeve 62; although of course it is most desirable to provide the sleeve 62 on the exterior of the casing shoe so that the upper rim of the sleeve will be in the direction facing away from the direction of travel of the shoe down the well bore and will not become accidentally snagged or stuck in the wall of the bore.

Figure 5:
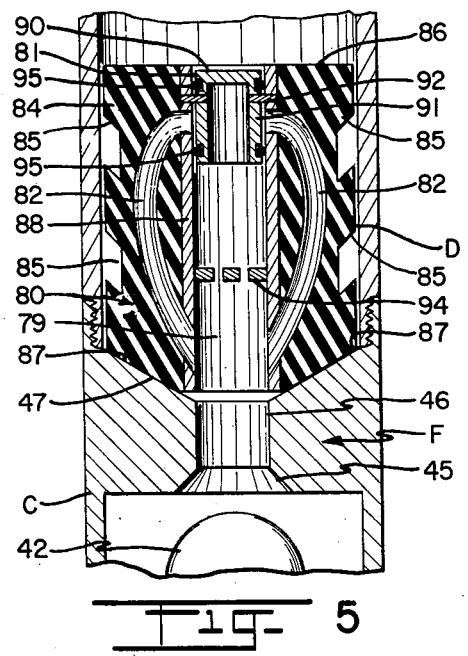
FIGURE 5 is a sectional view of still another modified form of pressure testing apparatus for disposition at an intermediate point along the casing string.
Figure 6:
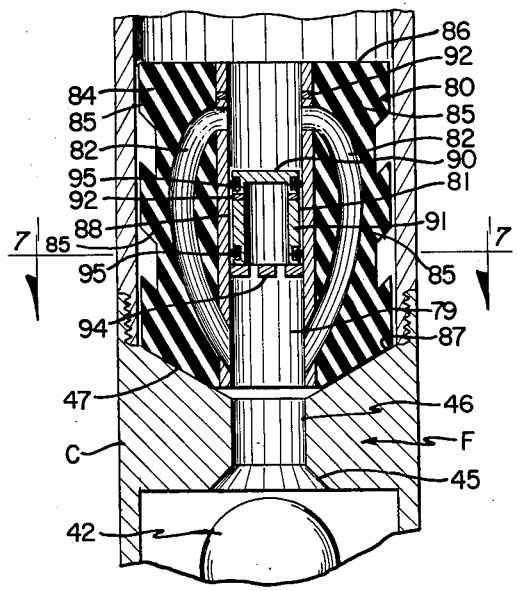
FIGURE 6 is a sectional view, similar to FIGURE 5, illustrating the relative movement of parts forming the modified form of pressure testing apparatus.
Figure 7:
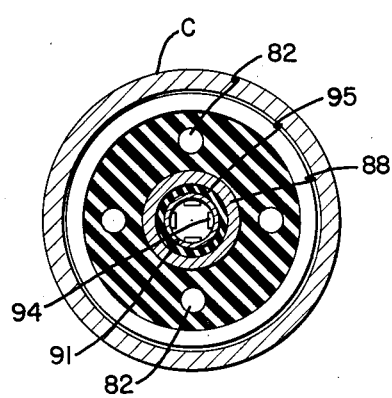
FIGURE 7 is a cross sectional view taken on line 7—7 of FIGURE 6.

There is shown in FIGS. 5 to 7 another modified form of the present invention wherein the pressure testing apparatus is defined by a casing collar D in place of the casing shoe described and shown in FIGS. 1 to 4. The collar D may be disposed at the desired intermediate point along the interior of the casing string C, but in the form shown is preferably adapted for disposition on the top inclined surface 47 of the float collar. Broadly, the casing collar is comprised of an annular, stationary element 80 which forms the connecting member and seal for support on the casing string, together with a closure element 81 to selectively close tubular sections defining by-pass fluid passages 82, which in the modified form of FIGS. 5 to 7 are provided in the stationary element 80 to communicate with main fluid passage 79 formed by the stationary element 80. To support the casing collar as a whole in the casing string, the annular member 80 is provided with a plug in the form of an outer, relatively thicked-walled section 84 having projections 85 along the exterior surface in the form of ribs contacting the casings, generally flat, top surface 86 and a sloping bottom surface 87 to engage and rest upon the top inclined surface 47 of the floating collar F. Secured to the inner wall of the plug 84 is a tubular liner 88 which is coextensive with the section 84. The plug 84 is preferably composed of a hard rubber and the tubular member 88 is preferably composed of a metallic material which is secured to the inner wall of the section 88 by means of suitable rubber adhesives. In turn, the passages 82 are most desirably spaced at intervals to extend through the body of the support element 80 and, as shown, curve outwardly through the intermediate portion of the plug, and verge gradually inwardly through the plug and tubular member into communication with the main passage 79.

In order to normally seal the main fluid passage 79 together with the auxiliary passages 82, the closure element 81 is suspended in position in the main fluid passage in opposition to the auxiliary passages 82 so as to block off the flow of fluid through the main passage into the auxiliary passages. For this purpose, the closure element 82 is of generally inverted, cup-shaped form including a top plate 90 together with a downwardly extending hollow cylindrical wall 91 and the closure member 81 is normally held in closed position in front of the auxiliary passage 82 by means of shear pins 92 extending inwardly from the tubular member 88 and through the thickness of the cylindrical wall portion 91 of the closure member. The shear pins 92 are of sufficient strength to withstand the normal fluid pressure level exerted within the casing string in testing for any leaks in the casing; however, upon the flow of drilling fluid under increased pressure down the casing string the weight and direct force of the fluid against the closing element will be sufficient to shear the pins at a point between its connection to the cylindrical wall portion 91 and tubular member 88 and as will be noted in FIG. 6 the closure member 81 will be forced downwardly through the main fluid passage 79 until it abuts against inwardly directed shoulder elements 94 which are attached to the tubular member 88 at a position between the inlet and outlet of the passages 82.

In pressure testing the casing string, it will be observed that the plug 84 will expand into sealing engagement with the casing string and float collar upon application of pressure thereto to the top surface. In order to seal off the main fluid passage 79 from the auxiliary passages during the pressure testing operations the closure member 81 is provided along the cylindrical wall surface with circular seals 95, such as O-rings, which are positioned both above and below the auxiliary passage 82. When the closure element is forced downwardly to the lower position contacting the shoulder elements 94, of course, the cement will then be free to flow through the by-pass passages 82, and the float collar F to the exterior of the casing string for the cementing operation. As the cement flows through the passages 82, the plug 84 will of course become slightly enlarged, on account of its elasticity and the spacing of the ribs along the outer surface, to again effectively seal the plug against the casing string.

Other working operations may be performed through the use of the casing shoe 26 or the casing collar 78 as above described. In the above forms of invention shown in FIGS. 1–4, it will be noted that it is not necessary to rupture the closure member prior to the cementing operation and that the utmost utilization is made of the forces normally employed in the casing string to actuate the members to the desired position to regulate the opening and closing of the passages. In this way, the necessity of auxiliary members to control opening and closing or to rupture the various elements are unnecessary; yet at the same time the pressure testing apparatus of the present invention is extremely reliable and dependable in operation and especially in the preferred forms of FIGS. 1 to 4 there is no danger of suspending the cementing operation due to possible clogging or interference with the flow of cement through the passages, since in the event this should occur the exterior or outer shear pins will simply be broken to permit release of the lower closure element for flow of the cement outwardly between the sleeve of the nose portion and the reduced lower end of the connector element. Moreover, it will be apparent that the elements forming the casing shoes may be composed of a drillable material when necessary to permit drilling out of the element subsequent to the cementing operation, such as, when the bottom of the casing is landed immediately above the pay zone.

It will be apparent from the foregoing description that various changes and modifications may be made in the construction and arrangement of the various forms of the present invention described without departing from the scope thereof, as defined by the appended claims.

I claim:

1. A casing shoe for attachment to the lower end of a casing string comprising, a generally cylindrical connector element converging into a reduced lower end portion with an external circular ledge projecting from the outer wall of said lower end, said connector including an annular plate at said lower end and an axial fluid passage extending therethrough into communication with a downwardly facing valve seat in said plate, a nose element of generally cup-shaped configuration including a valve plate positioned in said nose above its lower end carrying a valve element on its upper surface disposed for movement with said nose into and out of flush engagement with said valve seat, said nose including a sleeve extending upwardly from said valve plate in outer concentric relation over said ledge with an inwardly disposed abutment ring connected to the inner wall of said nose above said ledge to normally limit the downward movement of said nose as said valve element moves out of contact with said valve seat, and said nose being provided with at least one fluid passage extending downwardly therethrough in offset relation to the passage in said connector, resilient means interconnecting the opposing surfaces of said plates, and shear means interconnecting said abutment ring and said sleeve to permit relative axial movement therebetween and being adapted to be broken away at a predetermined pressure level to thereby permit separation between said nose and said connector elements in the event of interruption of the flow of fluid through said passages, the shearing of said shear means being prevented as said elements move together by the abutment of said valve element and valve seat, whereby said shear means will be sheared only when said elements are moving apart.

2. A casing shoe for attachment to the lower end of a casing string comprising, a generally cylindrical connector element converging into a reduced lower end portion having shear pins projecting from the outer wall of said lower end, said connector including a plate at said lower end and an axial fluid passage extending therethrough into communication with a downwardly facing annular valve seat on said plate, a nose element of generally cup-shaped configuration including a valve plate positioned in said nose above its lower end carrying a valve element on its upper surface for movement with said nose element into and out of engagement with said valve seat when the casing string is lowered with said nose element resting on the bottom of the well bore, said nose including a sleeve extending upwardly from said valve plate for disposition in outer concentric relation with said reduced lower end portion, said sleeve being provided with longitudinal slots to receive said shear pins so as to normally limit the downward movement of said nose as said valve element moves out of contact with said valve seat, said shear means operative to shear upon obstruction of the passages in said nose to move said connector and nose elements apart and being prevented from shearing as said last recited elements move together by the seating of said valve element in said valve seat and said nose element including at least one fluid passage extending downwardly therethrough from said valve plate in offset relation to the passage in said connector to establish communication between the interior of the casing string and the well bore when the casing string is raised to move said valve member out of engagement with said valve seat, and resilient means interconnecting the opposing faces of said plates of said connector and nose elements to dampen the movement of said elements between the open and closed positions.

3. A casing shoe according to claim 2 wherein said pins are constructed to shear at a predetermined pressure level to thereby permit separation between said elements.

References Cited in the file of this patent

UNITED STATES PATENTS

| | | |
|---|---|---|
| 1,849,168 | Brack | Mar. 15, 1932 |
| 1,880,778 | Byers | Oct. 4, 1932 |
| 1,933,951 | Young | Nov. 7, 1933 |
| 2,116,408 | O'Leary et al. | May 3, 1938 |
| 2,212,086 | Thornhill | Aug. 20, 1940 |
| 2,352,744 | Stoddard | July 4, 1944 |